UNITED STATES PATENT OFFICE.

CHARLES L. CAMPBELL, OF TERRE HAUTE, INDIANA.

IMPROVEMENT IN CATTLE-FOOD FROM DISTILLERY-SLOPS.

Specification forming part of Letters Patent No. 218,159, dated August 5, 1879; application filed May 22, 1879.

*To all whom it may concern:*

Be it known that I, CHARLES L. CAMPBELL, of Terre Haute, in the county of Vigo and State of Indiana, have invented a new and useful Process for Saving and Making Meal for Feeding Purposes from Distillery-Slop, which process is fully set forth in the following specification.

The invention relates to the preparation of food for feeding and fattening of cattle and hogs.

To carry out my invention I run the slop of a distillery through a trough into an empty vat, and there it remains until the meal is settled to the bottom; then the water is run off. Next, I press the meal or segments through rollers or a press, to thoroughly extract the water. Then it is placed in another vat, and is there sweetened by mixing with it soda, one part; lime, two parts; salt, two parts; salaratus, one part, to four hundred and ninety-four parts of meal. These are added to the damp solids, and readily dissolve and mix therein, after which I force it through a revolving dry-kiln. It passes in at one end, is dried and warmed, and comes out of the other prepared for use.

I am aware that it is not new to preserve brewers' and distillers' slops by drying the same, both with and without the addition of salt, sulphurous acid, sulphites or salicylic acid, and also steaming the same and pressing into blocks for convenience in transporting. Such, therefore, I do not broadly claim.

What I claim, and desire to secure by Letters Patent, is—

The process herein described of preserving distillery-slops as food for animals, consisting in extracting the bulk of the water therefrom, then adding soda, lime, salt, and salaratus thereto in the proportions specified, and finally desiccating the same.

CHARLES L. CAMPBELL.

Witnesses:
L. B. DENEHIE,
A. BRUCE COFFROTH.